(12) United States Patent
Mine

(10) Patent No.: US 6,641,382 B2
(45) Date of Patent: Nov. 4, 2003

(54) RESIN ENCAPSULATION MOLD

(75) Inventor: Tetsuichi Mine, Kumamoto (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/969,587

(22) Filed: Oct. 4, 2001

(65) Prior Publication Data

US 2002/0041911 A1 Apr. 11, 2002

(30) Foreign Application Priority Data

Oct. 6, 2000 (JP) .................................... 2000-307789

(51) Int. Cl.⁷ .................... B29C 45/14; B29C 70/72; H01L 21/56
(52) U.S. Cl. ............. 425/116; 264/272.17; 264/328.12; 425/125; 425/444; 425/556; 425/577
(58) Field of Search ................... 425/116, 125, 425/444, 556, 577, 544, 572, 588; 264/272.15, 272.17, 328.12

(56) References Cited

U.S. PATENT DOCUMENTS

| 4,555,086 A | * 11/1985 | Kiyotomo | 249/67 |
| 4,865,536 A | * 9/1989 | Inaba et al. | 425/556 |
| 5,074,779 A | * 12/1991 | Tsutsumi et al. | 425/444 |
| 5,252,051 A | * 10/1993 | Miyamoto et al. | 425/116 |
| 5,476,629 A | * 12/1995 | Yabe et al. | 264/328.7 |
| 6,179,599 B1 | * 1/2001 | Venrooij et al. | 425/116 |
| 6,435,855 B1 | * 8/2002 | Sakurai | 425/139 |

FOREIGN PATENT DOCUMENTS

| JP | 59033839 A | * 2/1984 | H01L/21/56 |
| JP | 04134837 A | * 5/1992 | H01L/21/56 |
| JP | 05129353 A | * 5/1993 | H01L/21/56 |
| JP | 11-87378 | 3/1999 | |
| JP | 2000-003923 A | * 1/2000 | H01L/21/56 |

* cited by examiner

Primary Examiner—Robert Davis
(74) Attorney, Agent, or Firm—Sughrue Mion, PLLC

(57) ABSTRACT

A resin encapsulation mold of the present invention comprises a lower mold, which is mounted on a lead frame, includes an indentation into which a semiconductor device is placed, and forms a gate through which resin is injected; an upper mold, in which an indentation is formed opposite the indentation of the lower mold to configure a cavity for holding the semiconductor device; a plurality of ejection pins, which protrude from the respective bottoms of the indentation of the upper mold and the indentation of the lower mold into a resin package body formed by injecting the resin from the gate into the cavity, and eject the resin package body; a vertical drive mechanism, which brings into contact and separates the upper mold and the lower mold; and protrusion adjustment means for adjusting the amount of protrusion of the respective ends of the plurality of ejection pins.

6 Claims, 6 Drawing Sheets

| d (AMOUNT OF PROTRUSION) | GAP DEVELOPMENT | DURATION (sec.) | AIR BUBBLE DEVELOPMENT |
|---|---|---|---|
| 0 ~ 30 | NO | 0 | NO |
| 30 ~ 60 | YES | 1 ~ 2 | YES |
| 60 ~ 100 | YES | UNTIL END OF RESIN INJECTION | YES |

CAVITY SIZE ; 32mm × 32mm T6.2mm
EJECTION PIN DIAMETER ; 2mm
MOLD TEMPERATURE ; 180°C
RESIN INJECTION RATE ; 2.3mm / sec.
VERIFICATION EQUIPMENT ; VIEW ABLE MOLD

RESIN ENCAPSULATION MOLD

BACKGROUND OF THE INVENTION

1. Field of the Invention

The present invention relates to a resin encapsulation mold. In particular, it refers to a resin encapsulation mold, which performs resin encapsulation for a chip-shaped semiconductor device that is mounted on a lead frame.

2. Description of the Prior Art

A chip-shaped semiconductor device mounted on a lead frame and having its electrode pads and leads of the lead frame wired are normally formed into a package body, which is an outer shell of resin and is encapsulated in resin using a resin encapsulation mold. In addition, current semiconductor devices tend to have packages having enlarged outer shells with thin walls, an increasing number of pins as outer leads, and ever narrowing pitch therebetween.

For such a semiconductor device, the resin encapsulation mold has had various suggested modifications come about such as regarding the velocity control of the ejection mechanism and clamping of the resin injection structure and/or the formed outer resin shell in order to prevent air bubbles, chips or cracks from developing in the outer resin shell used as the package body.

An example of semiconductor device fabrication equipment solving such problems is disclosed in Japanese Patent Application Laid-open No. Hei 11-87378. The resin encapsulation mold that is used as this semiconductor device fabrication equipment has a scale affixed to the lower mold and detects whether the position of the lower end of the scale is above a predetermined position or below it, and based upon the detection results, changes the speed at which the lower mold is dropped and reduces the load imposed on the semiconductor device during ejection of the semiconductor device from either the upper or lower mold in order to solve the problem of cracks or chips in the resin package body.

In addition, the load exerted during ejection by a load cell is detected, and if the amount detected is above a predetermined amount then a warning such as an alarm is given off, the equipment stops, and the residue on the mold is removed to solve the problems mentioned above that are due to residue being on the mold.

With the aforementioned semiconductor device fabrication equipment, while problems such as defects, cracks and breaks in the resin package body that develop during mold separation are able to be solved, the development of air bubbles near the injector pin during resin injection is unable to be avoided. In order to enclose a large semiconductor chip in a thin resin package, resin having low elasticity is used for injection so as not to impart damage to the wiring or interconnects. Alternatively, the resin injection speed is made exceedingly fast.

However, the injector pins that protrude from the inner walls of the cavity become an obstacle for the fast-flowing resin during the injection of resin from the gate. More specifically, as shown in FIG. 6, when the molten resin injected from the gate flows into cavity 6, the molten resin collides with ejection pin 7, a space develops near the shoulder-like portions of ejection pin 7, and this space becomes enveloped in the molten resin causing the problem of residual air bubbles.

In order prevent the development of such air bubbles, if the end surfaces of the ejector pins were to lay in the same plane as the inner walls of the cavity, then cavitation would not occur and leave behind air bubbles; however, even if the length of the ejection pins is precisely machined and they are accurately structured, the amount of protrusion of each ejection pin varies. For instance, supposing there are four ejection pins in each cavity, if there are eight cavities encapsulating a semiconductor device within the same mold, then there are a total of thirty-two ejection pins, which is a large number of pins. It is difficult to structure all of the ends of such ejection pins in the lower part of the indentation of the mold to lie in the same plane.

For example, even if the precision of the length of the ejection pins is machined to be within a few $\mu$m and assembled, due to manufacturing errors occurring in the flatness of the material comprising the mold and the structural precision of the mold, the amount of protrusion of all of the ejection pins in the bottom of indentations 9 and 10 may vary within a range of 100 $\mu$m or more. Even within the same cavity, the amount of protrusion may even be as much as 100 $\mu$m.

BRIEF SUMMARY OF THE INVENTION

Objects of the Invention

The objective of the present invention is to provide a resin encapsulation mold capable of encapsulating a semiconductor device in resin without having any air bubbles develop in the vicinity of ejection pins.

SUMMARY OF THE INVENTION

A resin encapsulation mold of the present invention comprises a lower mold, which is mounted on a lead frame, includes an indentation into which a semiconductor device is placed, and forms a gate through which resin is injected; an upper mold, in which an indentation is formed opposite the indentation of the lower mold to configure a cavity for holding the semiconductor device; a plurality of ejection pins, which protrude from the respective bottoms of the indentation of the upper mold and the indentation of the lower mold into a resin package body formed by injecting the resin from the gate into the cavity and eject the resin package body; a vertical drive mechanism, which brings into contact and separates the upper mold and the lower mold; and protrusion adjustment means for adjusting the amount of protrusion of the respective ends of the plurality of ejection pins protruding from the respective bottoms of the indentations of the lower mold and the upper mold comprising the cavity while resin is being injected into the cavity; wherein the amount of protrusion of the plurality of the ejection pins ranges between 0 and 60 $\mu$m.

BRIEF DESCRIPTION OF THE DRAWINGS

The above-mentioned and other objects, features and advantages of this invention will become more apparent by reference to the following detailed description of the invention taken in conjunction with the accompanying drawings, wherein.

DETAILED DESCRIPTION OF THE INVENTION

In the following, working examples of the present invention are described in detail while referencing the attached figures.

Figure 1A:
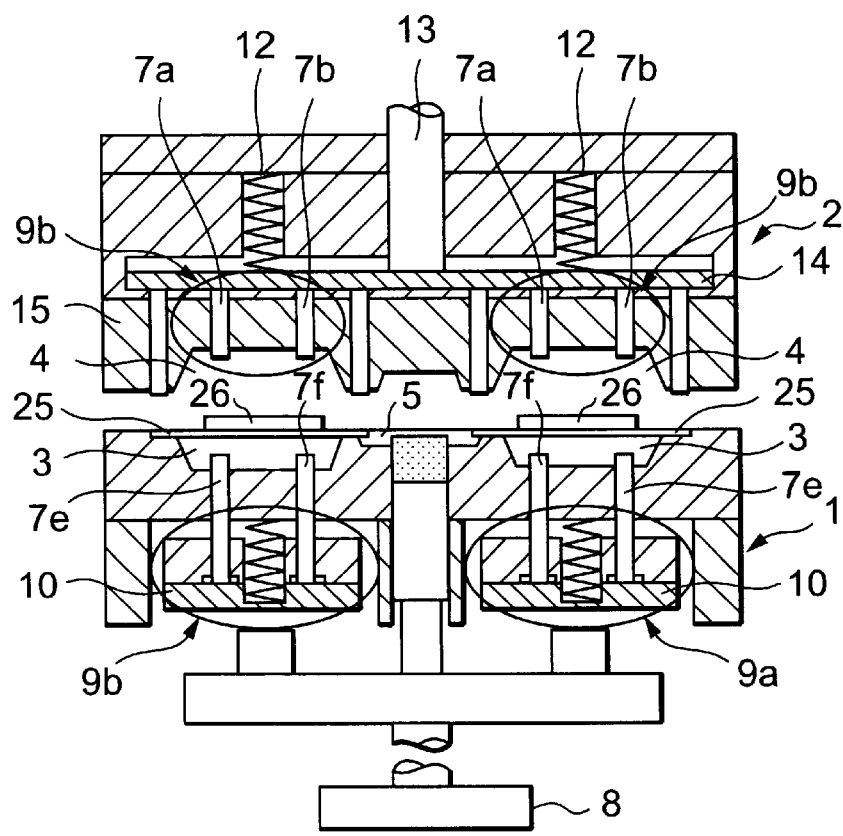
FIGS. 1A and 1B are cross-sectional views respectively showing the open and closed configurations of a resin encapsulation mold according to a working example of the present invention.
Figure 1B:
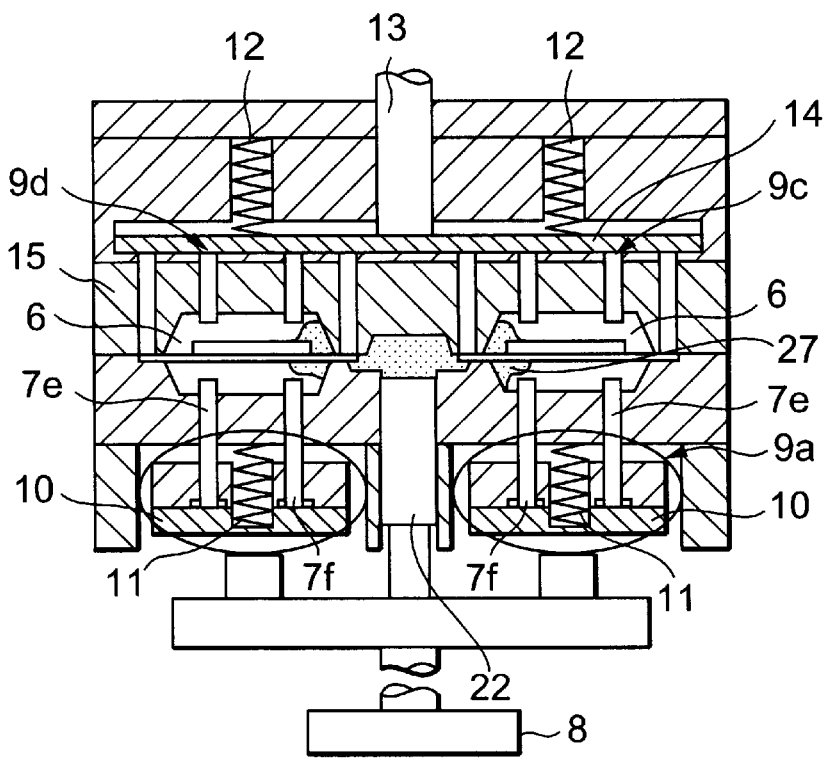

FIGS. 1A and 1B are cross-sectional views respectively showing the open and closed configurations of a resin encapsulation mold in a working example of the present invention. This resin encapsulation mold, as shown in FIG. 1, comprises lower mold 1, which is mounted on lead frame 25, forms gate 5 through which resin is injected, and includes indentation 3 into which chip 26, which is a semiconductor device, is placed; upper mold 2, which forms indentation 4 opposite indentation 3 of lower mold 1 to configure cavity 6, which holds chip 26; a plurality of ejection pins 7a, 7b, 7e, and 7f, which protrude from the bottom of indentation 4 of upper mold 2 and the bottom of indentation 3 of lower mold 1 into a resin package body formed by injecting resin 27 into cavity 6 from gate 5, and eject the resin package body; and vertical drive mechanism 8, which brings into contact and separates upper mold 2 and lower mold 1.

In addition, ejection pin holding mechanism 9a of lower mold 1 comprises plate 10, into which have been placed the plurality of ejection pins 7e and 7f so as to stand protruding from the bottom of indentation 3 of lower mold 1; and a spring, which acts to push/pull ejection pins 7e and 7f back from/towards the bottom of indentation 3. Ejection pin holding mechanism 9b of upper mold 2 comprises plate 14, into which has been placed ejection pins 7a and 7b so as to stand; and spring 12, which acts to push/pull ejection pins 7a and 7b back from/towards the bottom of indentation 4.

Figures 2A, 2B:
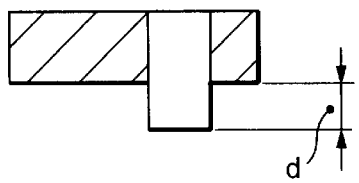
FIGS. 2A and 2B are diagrams for describing the amount of protrusion of the ejection pins at the respective bottoms of the indentations and the corresponding development of air bubbles.

FIGS. 2A and 2B are diagrams for describing the amount of protrusion of the ejection pins from the respective bottoms of the indentations and the corresponding development of air bubbles. For this, testing was performed using clear resin to fabricate a viewable mold in order to survey the amount of protrusion d of the ejection pins from the respective bottoms of the indentations, the development of gaps and their duration, along with the development of air bubbles.

During this testing, the ejection pins were fabricated from a commonly used mild steel and a plurality of pins were prepared as shown in FIG. 2A having lengths allowing the amount protruding to range from 0 to 100 $\mu$m. These ejection pins were assembled and inserted into the cavity, molten resin was allowed to flow in from the gate at actual speeds, continuously photographed using a high-speed camera, and the degree of gap and air bubble development was observed.

As a result, as shown in FIG. 2B, when the amount of protrusion d of the ejection pins was 30 $\mu$m or less, there was absolutely no development of either gaps or air bubbles. Furthermore, when the amount of protrusion was between 30 $\mu$m and 60 $\mu$m, although there were occurrences of gaps, they disappeared 1 or 2 seconds later and left only minute air bubbles. Moreover, when the amount of protrusion was between 60 and 100 $\mu$m, gaps developed and the air bubbles failed to dissipate leaving air bubbles in the bodies of the formed packages.

Figure 3A:
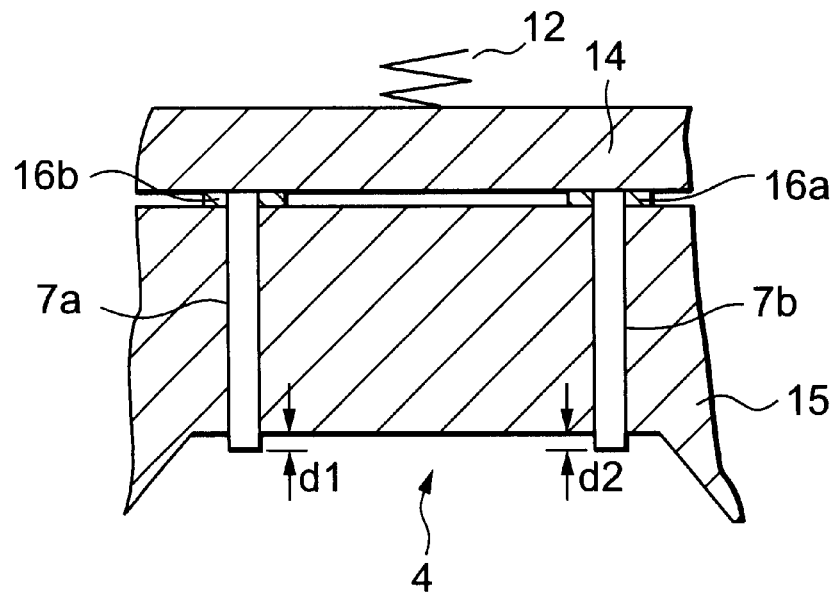
FIGS. 3A and 3B are cross-sectional views showing an extraction of the ejection pin holding mechanism of FIG. 1.
Figure 3B:
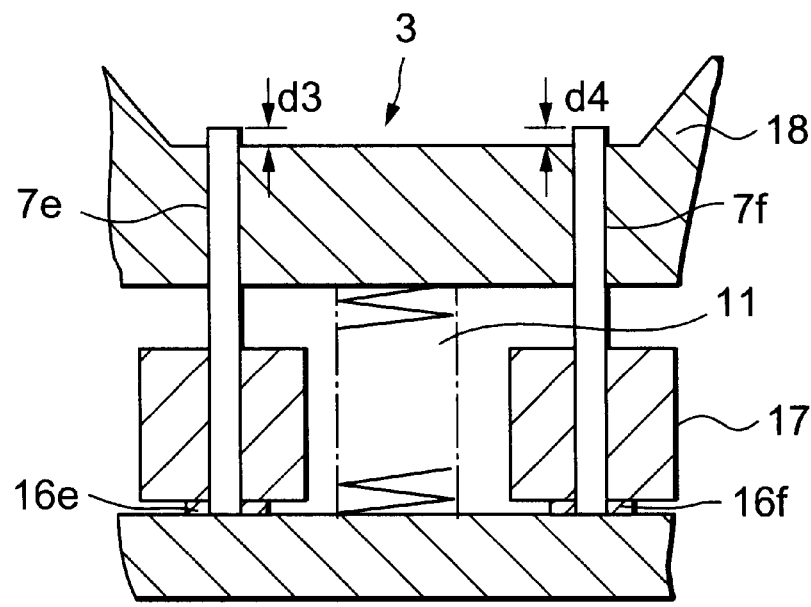

FIGS. 3A and 3B are cross-sectional views showing an extraction of the ejection pin holding mechanism of FIG. 1. By adjusting the amount of protrusion of the ejection pins based on the observations from the above-mentioned testing, the problem of air bubble development is solved.

To begin with, as shown in FIG. 3A, spacers 16a and 16b having appropriate thicknesses are inserted between plate 14, which preloads spring 12, and mold material 15 in the holding mechanism of the upper mold ideally so that the amounts of protrusion d1 and d2 of the end surfaces of ejector pins 7a and 7b, respectively, are within 30 $\mu$m. However, since it takes time to adjust the spacers so that the variances are within 30 $\mu$m, they are kept within 60 $\mu$m.

On the other hand, in the holding mechanism of the lower mold, as shown in FIG. 3b, between plate 10, which is preloaded by spring 11 from mold material 18 into which ejection pins 7e and 7f are placed so as to stand, and blocks 17, which are attached to the plate, spacers 16e and 16f having the appropriate thicknesses are inserted and adjusted so that as with the upper mold, the amounts of protrusion d3 and d4 of ejection pins 7e and 7f, respectively, are within 60 $\mu$m.

Once the amounts of ejection pin protrusion were adjusted for the upper mold and lower mold in this manner, when actual resin encapsulation of a semiconductor device was carried out, while it cannot be said that no air bubbles developed, the results were satisfactory in as far as the yield ratio.

Figure 4A:
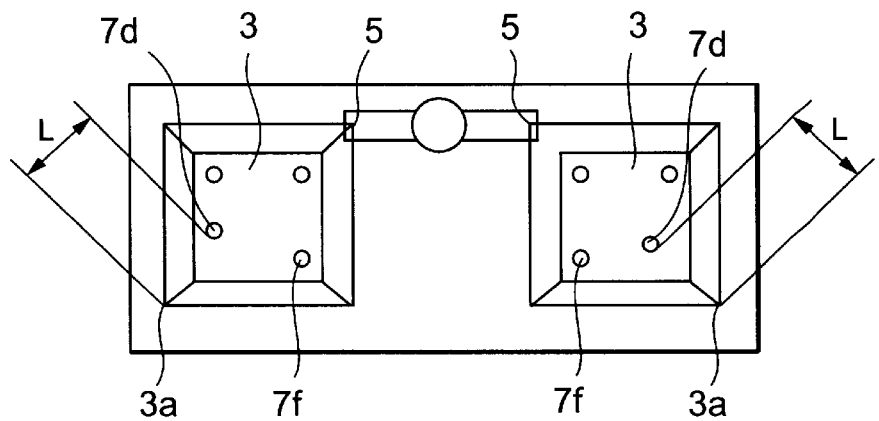
FIGS. 4A and 4B are planar views for describing a resin encapsulation mold according to another working example of the present invention.
Figure 4B:
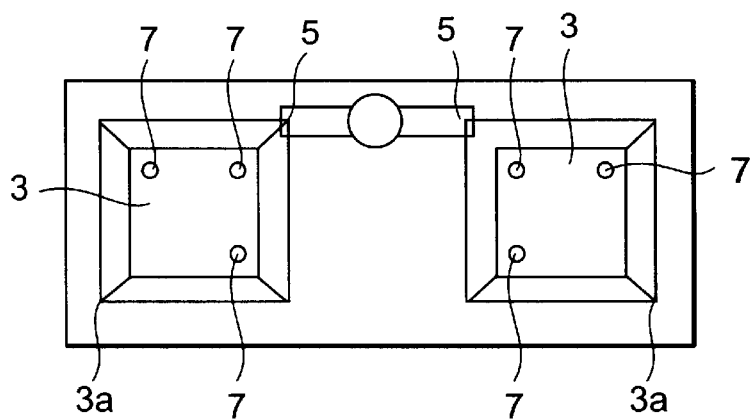

FIGS. 4A and 4B are planar views for describing a resin encapsulation mold according to another working example of the present invention. As described above, when the amounts of protrusion of the ejection pins were adjusted to be within 60 $\mu$m, testing was again carried out in order to re-examine the few air bubbles that developed.

As a result, it was found that the air bubbles that developed at the ejection pins near the gate became smaller and disappeared after a few seconds; however, a few air bubbles developed surrounding the ejection pins in locations furthest away from the gate (locations in corners facing the gate). This is thought to be due to quickly flowing resin from the gate colliding with the inside wall on the far side of the cavity and flowing backwards, and the back-flowing resin colliding with the ejection pin in the corner causing air to get mixed in.

Therefore, as shown in FIG. 4A, ejection pin 7d, which is in corner 3a opposite gate 5 within the four corners of indentation 3 of the lower mold, was moved to be separated by only distance L from corner 3a. Using the test mold, it was separated by at least 10 cm, for example, and subjected to testing. The results showed that the collision of the back-flowing resin with ejection pin 7d was mitigated so there was no mixing in of air nor development of air bubbles.

In addition, as further shown in FIG. 4B, the ejection pin that had been in corner 3a opposite gate 5 was removed, and when subjected to similar testing, gave satisfactory results with no development of air bubbles. Here the lower mold has been described; however, it is of course necessary to perform similar ejection pin positioning or ejection pin removal for the upper mold.

Figure 5A:
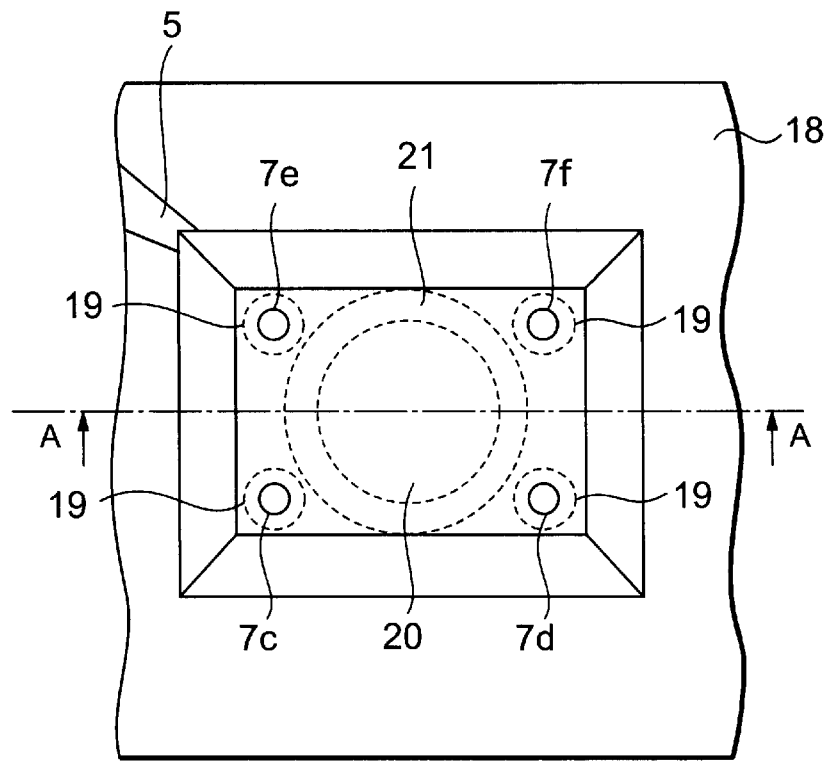
FIGS. 5A and 5B are a planar view showing an ejection pin holding mechanism and a cross-sectional perspective view cut along line AA thereof, respectively, for describing a resin encapsulation mold according to yet another working example of the present invention.
Figure 5B:
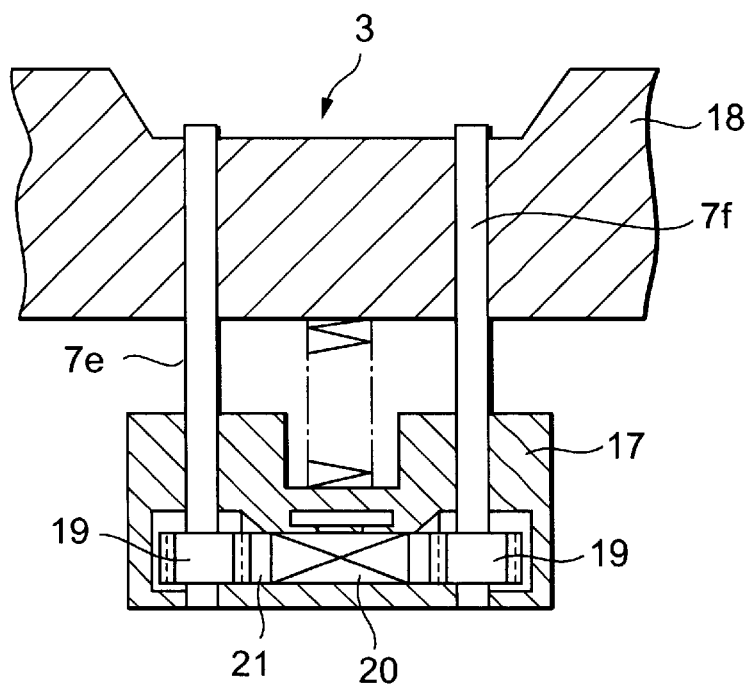
Figure 6:
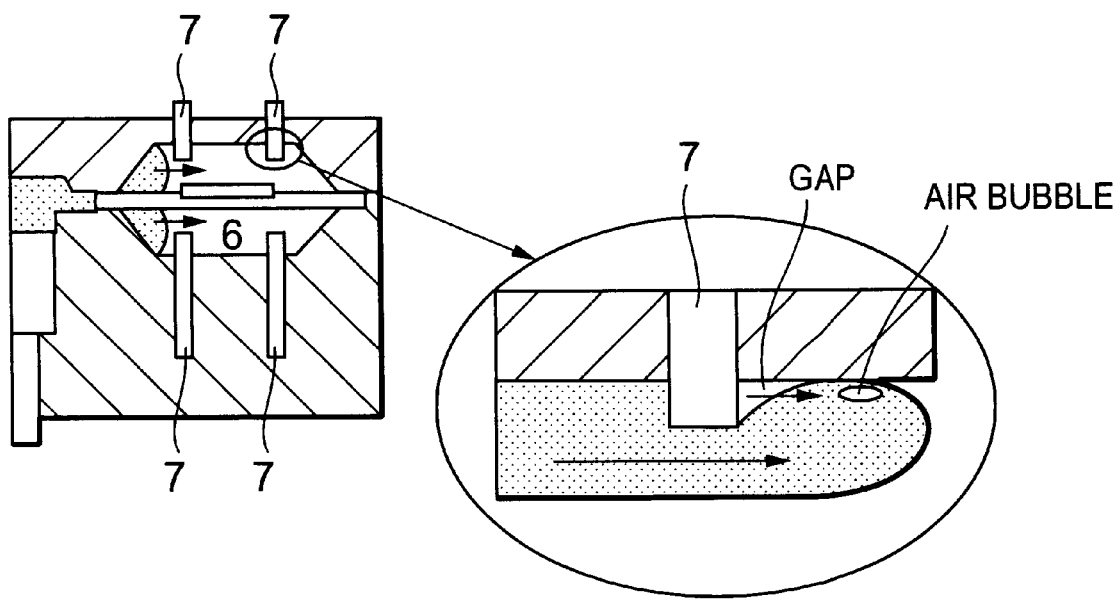
FIG. 6 is a diagram for describing problems occurring in a conventional resin encapsulation mold.

FIG. 5 is a planar view showing an ejection pin holding mechanism and a cross-sectional perspective view cut along line AA thereof for describing a resin encapsulation mold according to yet another working example of the present invention. With a normal configuration in which there is no mechanism for adjusting the amount of protrusion of the ejection pins, as shown in FIG. 2B, the amounts of protrusion of the ejection pins varies approximately 60 to 100 μm. Therefore, it was again wondered if there was a way to prevent the development of air bubbles even where there was this sort of variance in the amount of protrusion.

Therefore, as shown in FIG. 5, it was conceived that if ejection pins 7c, 7d, 7e and 7f were to be rotated during resin injection, cavitation would not occur due to the rotation; so a simple rotational mechanism was attached to the test mold and it was subjected to testing. The results showed no air bubble development.

This ejection pin rotational mechanism, as shown in FIG. 5, involves attaching pinions 19 to the respective lower ends of ejection pins 7c, 7d, 7e and 7f; providing gear wheel 21 for engaging these pinions 19; embedding the outer circumference of rotary solenoid 20 into the inside of this gearwheel 21; and affixing the rotational axis of rotary solenoid 20 to block 17.

This rotational mechanism is also of course adapted for the upper mold. In addition, plunger 22 is pushed using vertical drive mechanism 8 of FIG. 1 to melt the resin pellets, and as the molten resin is injected to the cavity from the gate, the ejection pins 7c, 7d, 7e and 7f are rotated. The starting and stopping of this rotation is controlled by the energization and deenergization of the solenoid of the rotary solenoid.

It is noted that the number of rotations of the ejection pins throughout this is determined by the gear ratio of pinions 19 to gearwheel 21. It is also of course possible to be determined using the rotational angle of rotary solenoid 20. Either way, it is preferable that ejection pins 7c, 7d, 7e, and 7f continue rotating until the cavity is filled with resin. When the cavity becomes filled with resin, the rotation of rotary solenoid 20 is halted.

It is also noted that since precise positioning of the location of plunger 22 as well as the amounts of protrusion of the respective ejection pins is necessary, it preferable that a screw feeding mechanism be used for the vertical drive mechanism shown in FIG. 1 rather than hydraulics. For example, any appropriate, commercially available ball-and-screw or ball-and-nut configuration may be used for this screw feeding mechanism.

As described above, in order to prevent the blockage by ejection pins of the molten resin flowing into a cavity at a high speed and the occurrence of cavitation when using a plurality of ejection pins that protrude into the outer resin shell of a semiconductor device that has been encapsulated, the present invention provides means for adjusting the amount of protrusion that the ejection pins protrude from the bottom of the cavity and a mechanism for rotating the ejection pins. By adjusting the amount of protrusion of the plurality of ejection pins to be within 60 μm and/or rotating the ejection pins during resin injection, formation is allowed without the development of air bubbles and no air bubbles remain in the outer resin shell, which results in improved product yield rates.

Although the invention has been described with reference to specific embodiments, this description is not meant to be construed in a limiting sense. Various modifications of the disclosed embodiments will become apparent to persons skilled in the art upon reference to the description of the invention. It is therefore contemplated that the appended claims will cover any modifications or embodiments as fall within the true scope of the invention.

What is claimed is:

1. A resin encapsulation mold comprising:
   a lower mold, which is mounted on a lead frame, includes an indentation into which a semiconductor device is placed, and forms a gate through which resin is injected;
   an upper mold, in which an indentation is formed opposite the indentation of said lower mold to configure a cavity for holding said semiconductor device;
   a plurality of ejection pins, which protrude from the respective bottoms of the indentation of said upper mold and the indentation of said lower mold into a resin package body formed by injecting said resin from said gate into said cavity and eject said resin package body;
   a vertical drive mechanism, which brings into contact and separates said upper mold and said lower mold; and
   protrusion adjustment means for adjusting the amount of protrusion of the respective ends of the plurality of said ejection pins protruding from the respective bottoms of the indentations of said lower mold and said upper mold comprising said cavity while resin is being injected into said cavity;
   wherein the amount of protrusion of the plurality of said ejection pins ranges between 0 and 60 μm; and
   wherein said protrusion adjustment means comprises:
   a pin plate member, in which said ejection pins are placed so as to stand upon the surface thereof and slides up and down within a guide hole of a mold member;
   a spring, which acts to push/pull said ejection pins back from/towards the bottom of said cavity; and
   a spacing member, which is inserted into a location in contact with said plate member and said ejection pins.

2. A resin encapsulation mold comprising:
   a lower mold, which is mounted on a lead frame, includes an indentation into which a semiconductor device is placed, and forms a gate through which resin is injected;
   an upper mold, in which an indentation is formed opposite the indentation of said lower mold to configure a cavity for holding said semiconductor device;
   a plurality of ejection pins, which protrude from the respective bottoms of the indentation of said upper mold and the indentation of said lower mold into a resin package body formed by injecting said resin from said gate into said cavity and eject said resin package body;
   a vertical drive mechanism, which brings into contact and separates said upper mold and said lower mold; and
   protrusion adjustment means for adjusting the amount of protrusion of the respective ends of the plurality of said ejection pins protruding from the respective bottoms of the indentations of said lower mold and said upper mold comprising said cavity while resin is being injected into said cavity;
   wherein the amount of protrusion of the plurality of said ejection pins ranges between 0 and 60 μm; and
   wherein of the plurality of said ejection pins, the ejection pins respectively located in the corners of the indentation of said upper mold and said lower mold opposite said gate are separated from said corner by only a predetermined distance.

3. A resin encapsulation mold comprising:
   a lower mold, which is mounted on a lead frame, includes an indentation into which a semiconductor device is placed, and forms a gate through which resin is injected;
   an upper mold, in which an indentation is formed opposite the indentation of said lower mold to configure a cavity for holding said semiconductor device;
   a plurality of ejection pins, which protrude from the respective bottoms of the indentation of said upper mold and the indentation of said lower mold into a resin package body formed by injecting said resin from said gate into said cavity and eject said resin package body;

a vertical drive mechanism, which brings into contact and separates said upper mold and said lower mold; and protrusion adjustment means for adjusting the amount of protrusion of the respective ends of the plurality of said ejection pins protruding from the respective bottoms of the indentations of said lower mold and said upper mold comprising said cavity while resin is being injected into said cavity;

wherein the amount of protrusion of the plurality of said ejection pins ranges between 0 and 60 $\mu$m; and wherein there are none of said ejection pins located in the respective corners of the indentation of said upper mold and said lower mold opposite said gate; and the other plurality of said ejection pins are disposed in the remaining corners of the four corners of the respective said indentations of said upper mold and said lower mold.

4. A resin encapsulation mold comprising:

a lower mold, which is mounted on a lead frame, includes an indentation into which a semiconductor device is placed, and forms a gate through which resin is injected;

an upper mold, in which an indentation is formed opposite the indentation of said lower mold to configure a cavity for holding said semiconductor device;

a plurality of ejection pins, which protrude from the respective bottoms of the indentation of said upper mold and the indentation of said lower mold into a resin package body formed by injecting said resin from said gate into said cavity and eject said resin package body;

a vertical drive mechanism, which brings into contact and separates said upper mold and said lower mold; and a rotational mechanism, which rotates the plurality of said ejection pins.

5. The resin encapsulation mold mentioned in claim 1, wherein said vertical drive mechanism is a screw feeding mechanism.

6. A resin encapsulation mold comprising:

a lower mold, which is mounted on a lead frame, includes an indentation into which a semiconductor device is placed, and forms a gate through which resin is injected;

an upper mold, in which an indentation is formed opposite the indentation of said lower mold to configure a cavity for holding said semiconductor device;

a plurality of ejection pins, which protrude from the respective bottoms of the indentation of said upper mold and the indentation of said lower mold into a resin package body formed by injecting said resin from said gate into said cavity and eject said resin package body;

a vertical drive mechanism, which brings into contact and separates said upper mold and said lower mold; and protrusion adjustment means for adjusting the amount of protrusion of the respective ends of the plurality of said ejection pins protruding from the respective bottoms of the indentations of said lower mold and said upper mold comprising said cavity while resin is being injected into said cavity;

wherein the amount of protrusion of the plurality of said ejection pins ranges between 0 and 60 $\mu$m; and wherein said vertical drive mechanism is a screw feeding mechanism.

\* \* \* \* \*